United States Patent
Copello

(10) Patent No.: US 7,380,886 B1
(45) Date of Patent: Jun. 3, 2008

(54) PIVOT COLUMN FOR A CHAIR ARMREST OR SIMILAR MECHANISM

(76) Inventor: David John Copello, 1342 San Mateo Ave., South San Francisco, CA (US) 94080

( * ) Notice: Subject to any disclaimer, the term of this patent is extended or adjusted under 35 U.S.C. 154(b) by 469 days.

(21) Appl. No.: 11/089,143

(22) Filed: Mar. 24, 2005

(51) Int. Cl.
*A47C 7/54* (2006.01)
*B60N 2/46* (2006.01)
*F16D 69/00* (2006.01)

(52) U.S. Cl. ............... 297/411.35; 297/411.31; 188/265

(58) Field of Classification Search ........... 297/411.37, 297/411.31, 411.32, 344.22, 411.35; 403/105, 403/104, 78, 164, 165; 188/82.84, 265; 16/342, 16/334
See application file for complete search history.

(56) References Cited

U.S. PATENT DOCUMENTS

| | | | |
|---|---|---|---|
| 838,024 A * | 12/1906 | Hendricks | 188/82.3 |
| 3,745,998 A | 7/1973 | Rose | |
| 4,327,046 A | 4/1982 | Davis et al. | |
| 4,347,213 A | 8/1982 | Rogers, Jr. | |
| 4,615,856 A | 10/1986 | Silverman | |
| 4,622,185 A | 11/1986 | Kostich | |
| 4,828,325 A | 5/1989 | Brooks | |
| 4,890,885 A | 1/1990 | Grossmann | |
| 4,960,304 A | 10/1990 | Frantz | |
| 5,393,124 A * | 2/1995 | Neil | 297/411.35 |
| 5,556,169 A | 9/1996 | Parrish et al. | |
| 5,617,650 A | 4/1997 | Grim | |
| 5,887,948 A * | 3/1999 | Hannes | 297/411.35 |
| 5,985,188 A | 11/1999 | Jennings et al. | |
| 6,073,741 A * | 6/2000 | Liu | 192/45 |
| 6,076,891 A * | 6/2000 | Bernhardt | 297/411.31 |
| 6,161,238 A | 12/2000 | Graebe | |
| 6,217,121 B1 | 4/2001 | Mollet | |
| 6,358,459 B1 | 3/2002 | Ziegler et al. | |
| 6,378,948 B1 | 4/2002 | Macher et al. | |
| 6,877,811 B1 * | 4/2005 | Garelick | 297/344.22 |
| 2003/0218370 A1 * | 11/2003 | Langham | 297/344.22 |

FOREIGN PATENT DOCUMENTS

JP 409327856 A 12/1997

OTHER PUBLICATIONS

U.S. Appl. No. 60/468,397, filed May 6, 2003, David Copello.

* cited by examiner

*Primary Examiner*—David R. Dunn
*Assistant Examiner*—Kaitlin A Wilson
(74) *Attorney, Agent, or Firm*—Margaret Polson; Patent Law Offices of Rick Martin, P.C.

(57) ABSTRACT

A pivoting column with stop cells formed inside the column is disclosed. The stop cells have to functioning positions, a locking position and a moving position. In the locked position the stop cells allow the column to rotate freely in one chosen direction, and prevent rotation in the opposite direction. In the moving position the stop cells allow free rotation of the column in either direction.

5 Claims, 3 Drawing Sheets

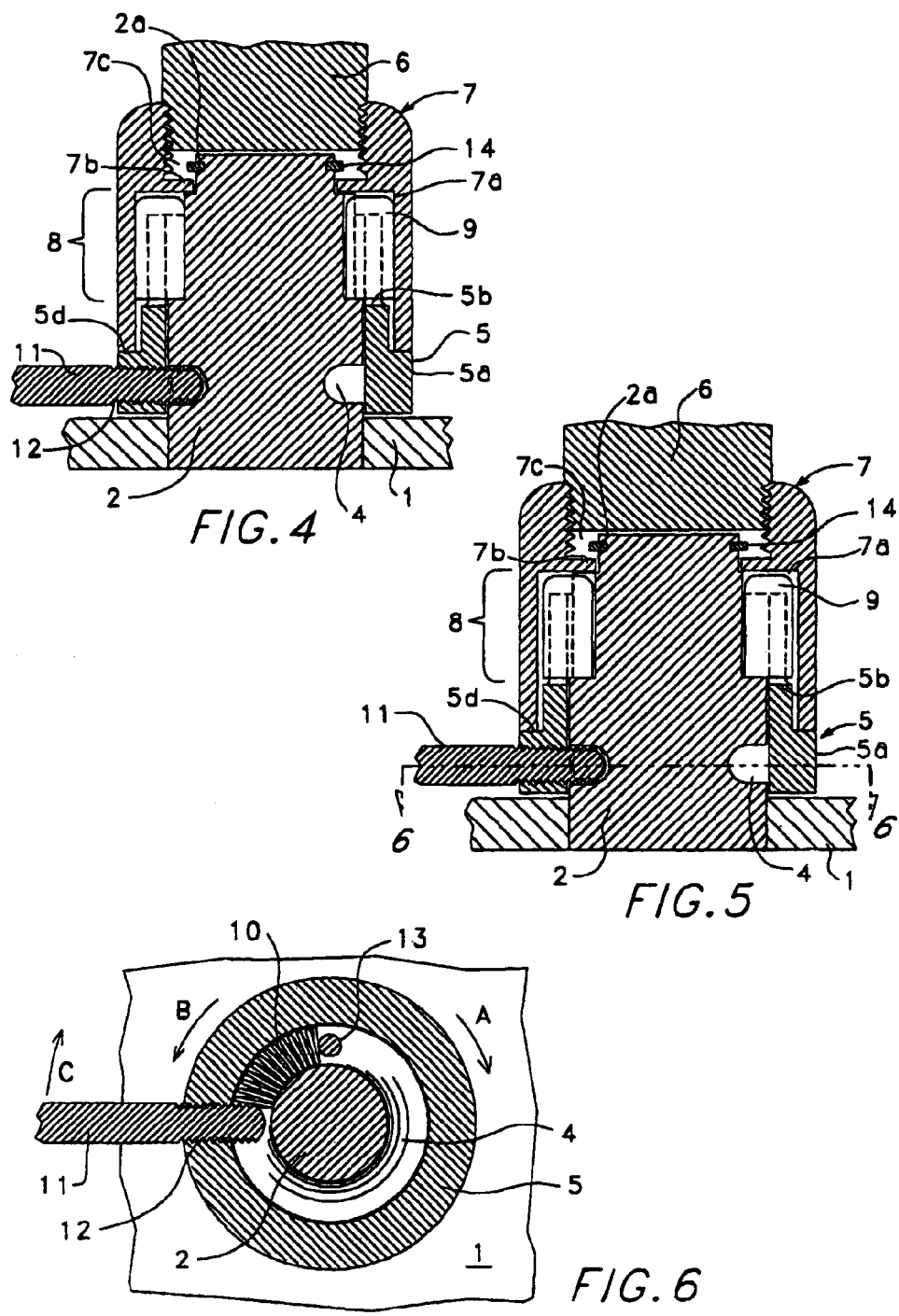

US 7,380,886 B1

PIVOT COLUMN FOR A CHAIR ARMREST OR SIMILAR MECHANISM

FIELD OF INVENTION

The present invention relates to a pivoting column mount for an armrest or other support. The column rotates freely in one direction but prevents rotation in the other direction unless an unlocking mechanism is released. This type of pivot mount is particularly useful in the armrest of chairs for dental professionals and other health professionals. This allows the armrest to be used as a body support to reduce back strain when leaning over a patient. The column could also be used a feed roller where it is desirous that a sheet material feed freely in one direction and can only move in the other direction when unlocked.

BACKGROUND OF THE INVENTION

Chairs for dental professionals are increasingly designed to prevent back strain and injury. The bent forward position is required to work on the patient's mouth could cause significant back problems over the long term.

One known device for helping to reduce back strain is a chair arm that can pivot around its support post and lock into a desired position. The arm is shaped to allow the user to rest the front of their torso on the rest as they lean forward. This type of armrest is made by Mathison, Adec and Link Erogmomics. These arms rotate freely toward the body of the user, but can be locked in place to prevent rotation in the opposite direction, allowing the user to rest their body weight against the armrest when the user leans forward.

One known type of arm rest uses a single direction ratchet in the arm rest support to allow for rotation in one direction and locking the in the other direction. One limitation of such arms is that since the ratchet can only lock into positions determined by the "teeth" of the ratchet, the arm is not infinitely adjustable. Finer adjustments can be created by having a ratchet with smaller, closely spaced, teeth. However, the smaller the teeth, the more breakage of teeth over time become a problem.

The present invention solves this problem by allowing providing a pivoting support that freely rotates in one direction, and can be locked into position in any position in the other direction of rotation.

In other applications it is known the art to have rollers for feeding sheets of material (fabric, paper, plastic etc) through feeding rollers. The column of the present invention can also be used as a feed roller in applications where the material should feed in only one direction unless the user unlocks the roller, to clear a jam for example.

SUMMARY OF THE INVENTION

The primary aspect of the present invention is to provide a pivoting support column for an armrest or other device that allows free rotation in on direction and can be locked into position in any location in the other direction.

Other aspects of this invention will appear from the following description and appended claims, reference being made to the accompanying drawings forming a part of this specification wherein like reference characters designate corresponding parts in the several views.

The present invention is a pivoting column with stop cells formed inside the column. The stop cells have to functioning positions, a locking position and a moving position. In the locked position the stop cells allow the column to rotate freely in one chosen direction, and prevent rotation in the opposite direction. In the moving position the stop cells allow free rotation of the column in either direction.

BRIEF DESCRIPTION OF THE DRAWINGS

FIG. 4 is a cross sectional view taken along line 4-4 of FIG. 2.

FIG. 5 is a cross sectional view taken along line 5-5 of FIG. 3.

FIG. 6 is a cross sectional view taken along line 6-6 of FIG. 5.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DESCRIPTION OF THE PREFERRED EMBODIMENT

Figure 1:
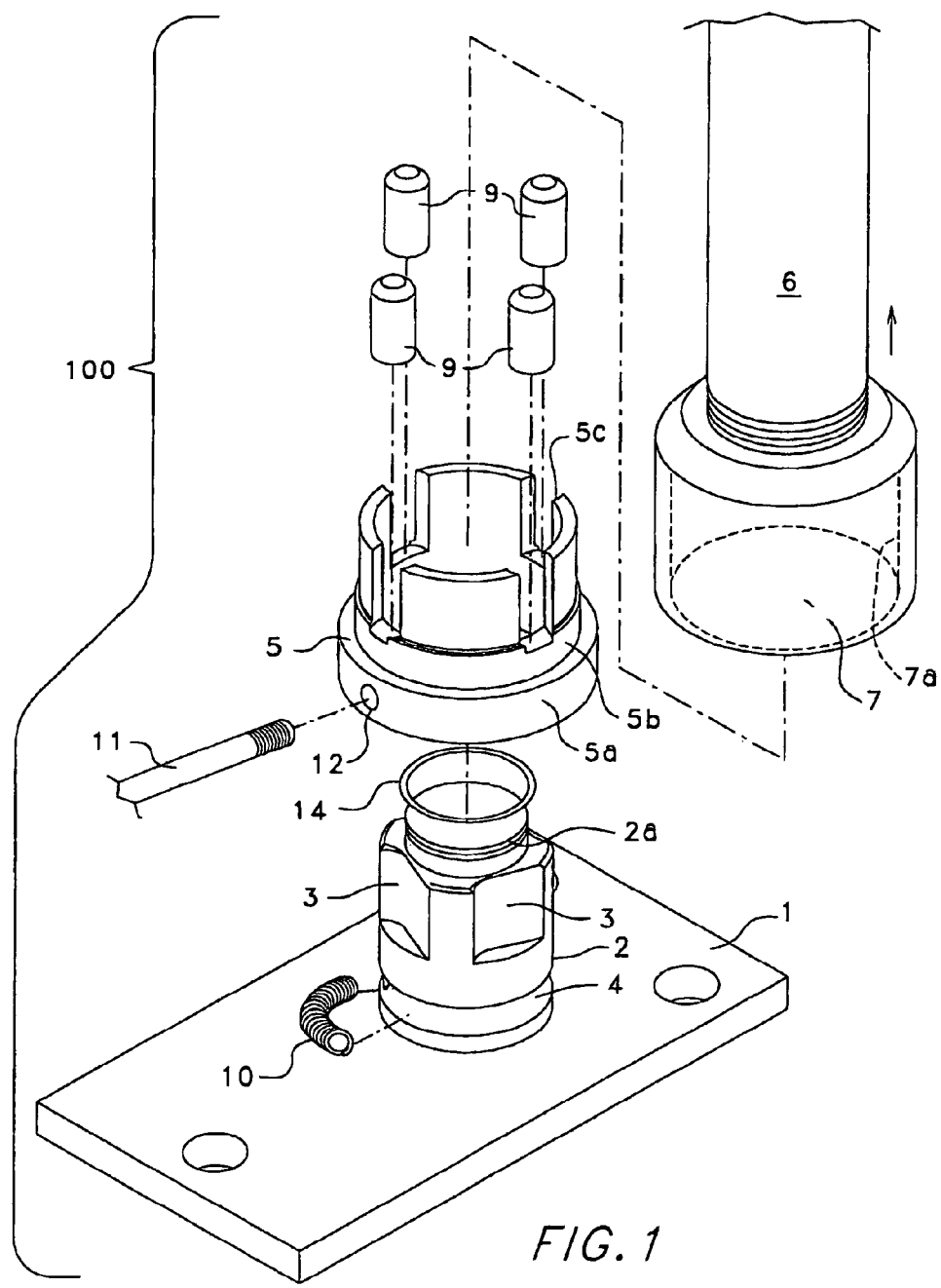
FIG. 1 is an exploded view of the present invention.

Referring first to FIG. 1, pivot column mount 101 is shown in an exploded view. For ease of viewing, the pivot column mount 101 is shown upside down relative to how it would preferably be used to mount a chair arm. In roller applications, the pivot column mount 101 would be mounted horizontally in most cases. If necessary the stop cells could be located at both ends of the column. The base plate 1 would be mounted to the underside of the chair arm (not shown) for chair are applications.

The inner shaft 2 is mounted into or on base plate 1. Inner shaft 2 has a plurality of recesses 3 which have a generally triangular or wedge shape, shown in FIGS. 2 and 3. In the depicted embodiment, there are four recesses 3. The number of recesses 3 will be determined by the diameter of inner shaft 2, the predicted use and the need for fail-safes. The inner shaft 2 also has an annular groove 4 around its circumference below the recesses 3.

A retaining bezel 5 is placed over inner shaft 2. The retaining bezel 5 has a base 5a and retaining section 5b. Retaining section 5b has cutouts 5c which are spaced to correspond to recesses 3. Retaining section 5b is narrower in diameter than base 5a, which forms shoulder 5d, shown in FIGS. 4 and 5.

Barrel 6 has a cavity 7a in one end shaped to fit over inner shaft 2 and rest on shoulder 5d, as shown in FIGS. 4, 5. In the disclosed embodiment cavity 7a is formed by attaching a hollow ring 7 by threading or other known equivalent attachment means. Depending on the application, the hollow ring 7 could be welded to the barrel 6, or otherwise permanently attached, once the pivot column mount 101 is assembled.

Inner shaft 2 has groove 2a to hold snap ring 12, as shown in FIGS. 4 and 5. Ring 7 has inner ridge 7b which is below groove 2a when the ring 7 is slide over retaining bezel 5. When snap ring 14 is placed in groove 2a, ridge 7b and snap ring 14 holds ring 7 in place. Other similar attachment mechanism would work as well. In the disclosed embodiment, barrel 6 is then threaded on to threads 7c.

Figure 2:
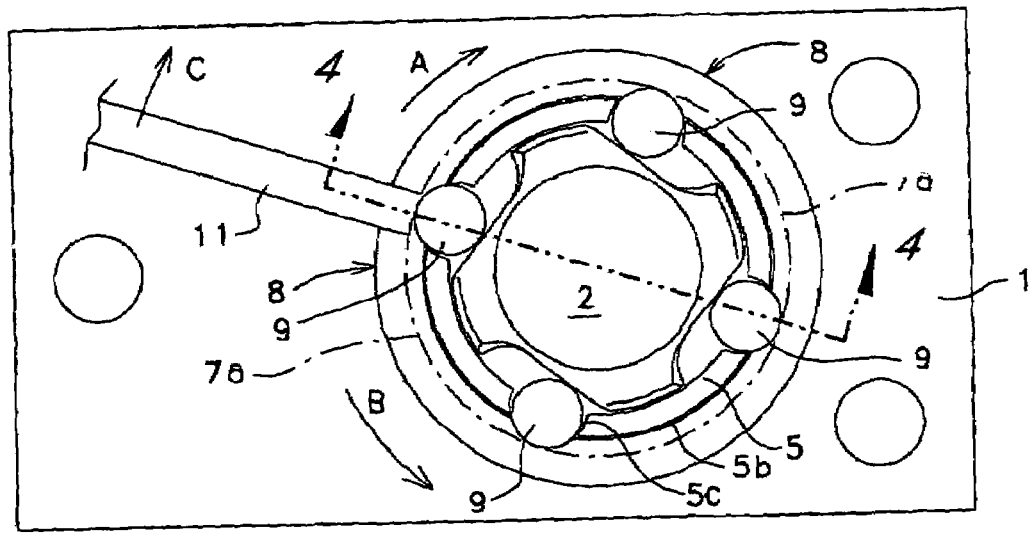
FIG. 2 is a bottom plan view of the stop cells of the present invention in the locked position.
Figure 3:
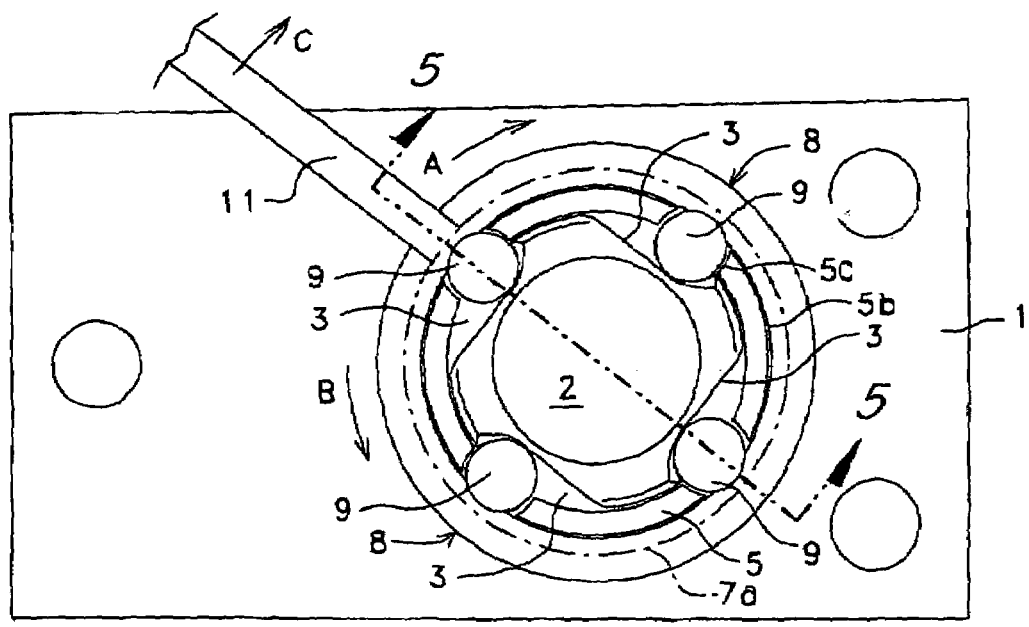
FIG. 3 is a bottom plan view of the stop cells of the present invention in the unlocked position.

Cavity 7a is shown as a dotted line in FIGS. 2 and 3. The spaces formed by cavity 7a and the recesses 3 hold dowel pins 9. The cutouts 5c, recesses 3, and inner surface of cavity 7a combine to form stop cells 8, shown in FIGS. 2, 3, 4, and 5.

As shown in FIGS. 2 and 3, the dowel pins 9 are held in cutouts 5c and extend into recesses 3. The dowel pins 9 sitting in cutouts 5c prevent the retaining bezel 5 from moving in either direction of rotation beyond the length of recesses 3.

The ring 7 can rotate around the inner shaft 2 and retaining bezel 5. There are two directions of rotation for ring 7, the free rotation direction, show by arrow A, and the locking direction, shown by arrow B in FIGS. 2, 3 and 6. Which direction is clockwise and counter clockwise will depend on the orientation of the stop cells 8, as further discussed below. Although the drawings only show one orientation, it is to be understood that the stop cells 8 can be set to have either clockwise or counter clockwise be the free rotation direction, and vice versa.

The stop cells 8 have two working positions. FIGS. 2 and 4 show the stop position; FIGS. 3 and 5 show the moving position. If the stop cells 8 are in the stop position, the dowel pins 9 are pressed against inner surface of cavity 7a by the slope 3a of recesses 3, as shown in FIGS. 2, 4. This prevents the ring 7 from rotating in the locking direction B. The overall sizing of all of the parts must allow the dowel pins 9 to firmly lock against inner surface of cavity 7a. Too much play in the stop cell 8 between the relevant parts will prevent proper locking of the rotation. The exact tolerances will depend on the application and the size of the embodiment. It is considered to be within the knowledge of one skilled in the art to provide the correct tolerances for operation.

If the stop cells 8 are in the moving position, the dowel pins 9 are moved down slope 3a of recesses 3, moving the dowel pins 9 away from inner surface of cavity 7a, allowing the ring 7 to rotate in the locking direction B, as shown in FIGS. 3 and 5. The recesses 3 at the deepest point have a depth sufficient to allow dowel pin 9 to be spaced away from the inner surface of cavity 7a when the stop cells 8 are in the moving position.

Retaining bezel 5 is spring biased to hold the stop cells 8 in the stop position by spring 10 mounted in groove 4 as shown in FIG. 6. Control arm 11 is mounted in to hole 12 in retaining bezel 5, shown in FIG. 1, and extends into groove 4, as shown in FIGS. 4, 5 and 6. Spring 10 is mounted between control arm 11 and pin 13 as shown in FIG. 6, biasing retaining bezel 5 in direction B into the locked position, shown in FIGS. 2 and 4.

The size and shape of control arm 11 will depend on the application of the pivot column mount 101. Depending on the application control arm 11 can have a high or low profile. A different biasing mechanism could also be used.

When control arm 11 is moved in the direction shown by arrow c, this moves the retaining bezel 5 and the dowel pins 9 to the moving position and compresses spring 10. This allows the ring 7 to be rotated in either direction as long as the control arm 11 is held in the position shown in FIG. 3.

If control arm 11 is released, spring 10 will move control arm 11, and consequently retaining bezel 5, in direction B back to the stop position shown in FIG. 2. In this position, as mentioned above, the ring 7 and barrel 6 cannot be rotated in the locking direction B as described above. However, if the ring 7 is moved in the free rotating direction A friction will move the dowel pins 9 and retaining bezel 5 far enough down slope 3a of recesses 3 that the dowel pins 9 can rotate, allowing the ring 7 and barrel 6 to rotate freely in the free rotation direction A.

If desired, the biasing mechanism could be set up in reverse, holding the stop cells in the moving position. This would mean that the column could rotate freely in either direction, until locked in place, then the column could only pivot in one direction. This is an advantage over the prior art ratchet systems, which cannot work that way.

Another alternative would be to have latch system which would allow the stop cells to be held in either position. This could be a simple toggle latch or other known latch mechanism, with at catch in two locations, one for each position.

Although the present invention has been described with reference to preferred embodiments, numerous modifications and variations can be made and still the result will come within the scope of the invention. No limitation with respect to the specific embodiments disclosed herein is intended or should be inferred.

I claim:

1. A pivoting column comprising:
   a base;
   a inner shaft;
   said inner shaft having at least one generally triangular recess;
   a retaining bezel circumferentially around the inner shaft;
   said retaining bezel having at least one cutout, said cutouts having a width less than the width of the triangular recess;
   at least one substantially circular dowel pin resting in a cutout and a recess simultaneously;
   a hollow ring circumferentially around the retaining bezel and being a distance X from said retaining bezel
   said hollow ring being rotatably mounted to the inner shaft and holding the retaining bezel and dowel pin(s) in their relative spatial relationships around the inner shaft;
   said recess, cutout and dowel pin forming a stop cell;
   said stop cell having two functional positions, a stop position and a moving position;
   said stop cell functioning in the stop position to allow said hollow ring to rotate freely in a free rotation direction and to prevent rotation in the opposite, locking direction and in the moving position to allow free rotation in either direction; and
   a biasing mechanism wherein the stop cells are biased to one position.

2. The pivoting column of claim 1 further comprising a locking mechanism to lock the stop cell in either position.

3. The pivoting column of claim 1 wherein there are four stop cells.

4. A pivoting column comprising:
   a base;
   a inner shaft;
   said inner shaft having at least one generally triangular recess;
   a retaining bezel circumferentially around the inner shaft;
   said retaining bezel having at least one cutout, said cutouts having a width less than the width of the triangular recess;
   at least one substantially circular dowel pins resting in a cutout and a recess simultaneously;
   a hollow ring circumferentially around the retaining bezel and being a distance X from said retaining bezel said hollow ring being rotatably mounted to the inner shaft and holding the retaining bezel and dowel pin in their relative spatial relationships around the inner shaft;

said recess, cutout and dowel pin forming a stop cell;

said stop cell having two functional positions, a stop position and a moving position;

said stop cell functioning in the stop position to allow said hollow ring to rotate freely in a free rotation direction and to prevent rotation in the opposite, locking direction and in the moving position to allow free rotation in either direction; and wherein the pivoting column is a support column for a pivoting arm of a chair.

5. The pivoting column of claim 4 wherein the free rotation direction is toward a user's body when the user is seated and the locking direction is away from the user's body.

* * * * *